US006549946B1

(12) United States Patent
Fisher et al.

(10) Patent No.: US 6,549,946 B1
(45) Date of Patent: Apr. 15, 2003

(54) APPARATUS AND METHOD FOR TELECOMMUNICATION ROUTING AND PARAMETER NEGOTIATION

(75) Inventors: Mark Edward Fisher, Rochester, MN (US); Robert John Manulik, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/082,493

(22) Filed: May 21, 1998

(51) Int. Cl.[7] ............................................... G06F 15/16
(52) U.S. Cl. ....................... 709/227; 709/228; 709/229; 370/230
(58) Field of Search ................................. 709/228, 227, 709/223, 224, 225, 229; 379/207, 211, 219, 220, 221, 229, 230; 370/230, 401, 410, 522

(56) References Cited

U.S. PATENT DOCUMENTS

| | | | | |
|---|---|---|---|---|
| 5,459,721 A | * | 10/1995 | Yoshida | 370/60 |
| 5,473,679 A | * | 12/1995 | La Porta et al. | 379/201 |
| 5,884,313 A | * | 3/1999 | Talluri et al. | 707/10 |
| 5,933,425 A | * | 8/1999 | Iwata | 370/351 |
| 6,005,931 A | * | 12/1999 | Neyman et al. | 379/220 |
| 6,044,205 A | * | 3/2000 | Reed et al. | 709/201 |
| 6,175,571 B1 | * | 1/2001 | Haddock et al. | 370/423 |
| 6,185,288 B1 | * | 2/2001 | Wong | 379/219 |

* cited by examiner

Primary Examiner—Zarni Maung
(74) Attorney, Agent, or Firm—Schmeiser, Olsen & Watts; Steven W. Roth; James R. Nock (57) ABSTRACT

According to the preferred embodiments of the present invention, a method and an apparatus for efficiently and accurately processing incoming connection establishment requests is disclosed. The present invention allows the signaling provider of the network interface software to determine ownership of an incoming request by accessing client-provided information in the form of call filters. Upon receiving an incoming call establishment request, the network interface software matches the request to information previously provided by the clients of the network interface software. The network interface software can thus determine the correct recipient, negotiate parameters on the owner's behalf, establish a call connection, inform the client that the connection has been established, and inform the client of specific parameters relating to the incoming call.

33 Claims, 8 Drawing Sheets

```
09038000 11058000 67588000 0b058c05 ec8105ec 84005980 00098405 93fe8505
93febe5e 80000310 80805f80 00096b40 808000a0 3e000270 800015b2 39999999
99999900 00999910 02020000 00ee0603 6c800016 02803999 99999999 99000099
99101002 000000ee 05035ce0 00020000
```

```
// 1. Create an empty CallFilter
CallFilter * callFilter = new CallFilter();

//2. Create Selectors for each IE:
CalledPn* calledPn = callFilter->CreateCalledPn(8883214321);
Qos*    qos = callFilter->CreateQos(qq);
int           lliId1 = 1;     //Client picks an id to identify lli 1
int           lliId2 = 2;     //Client picks an id to identify lli2
// The Client sets "negotiable" for AAL parameters:
AalParameters aalP = callFilter->CreateAalParms("aal 5",
                                                          negotiable);
// Client tells the signaling provider to notify him which lli
// was received when a call is accepted:
        lli1->NotifyWithDataIfCallAccepted(lliId1);
        lli2->NotifyWithDataIfCallAccepted(lliId2);
// etc.....

// 3. Set the order of evaluation of Selectors.
// The logical relationship of the chained Selectors is as follows:
// chain = calledPn AND qos AND aalP AND trafDesc AND
//       (lli1 OR lli2).
Selector * chain =
calledPn->AND(
            qos->AND(
                    aalP->AND(
                            trafDesc->AND(
                                        lli1->OR(
                                        lli2->)
                                        )
                                )
                        )
                );

// 4. Assign the Selector chain to the Call Filter:
callFilter->Assign(chain);
```

FIG. 8

APPARATUS AND METHOD FOR TELECOMMUNICATION ROUTING AND PARAMETER NEGOTIATION

BACKGROUND OF THE INVENTION

1. Technical Field

This invention generally relates to computers and data processing and more specifically relates to computer communications and data transmission.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One way computers have become more powerful is in their ability to "network," or communicate, with other computers. A computer typically sends and receives data over a network of communications links using a combination of network interface hardware and software, which provides a logical and physical link to the network. The network interface hardware serves to transmits electrical and/or optical signals over the telecommunications lines. The network interface software supports the transfer of data by performing functions such as establishing connections with remote computer systems, routing the data to designated recipients, and converting data from one format to another.

For a typical computer-to-computer information transfer, a fairly standard procedure may be used to establish a connection between two computers which are geographically or logically separated from each other. Initially, the computer seeking to establish the connection sends a communications request to another computer. Incoming communications requests generally include information parameters that are specific for a given client and that may vary from client to client. For example, some parameters may define origination and destination numbers, provide additional addressing information, specify a standard protocol to be used to process messages, identify the data throughput of the network, or specify whether the prospective communication will contain audio, video, or other forms of data. This information is used both to identify the owner of an incoming request and to negotiate specific parameters for a successful connection and information transfer. Once the communications request has been received and processed by the network interface of the destination computer, the actual data or message may be transferred to the intended recipient within the destination computer system.

A typical recipient of an incoming communications request may be any type of software program or process within the destination computer system, such as an application software program, systems software program, a utility program, or a subroutine. Alternatively, a recipient may be a software program or process outside the destination computer system, which shares use of the destination computer system's network interface. In more general terms, a recipient of an incoming communications request may be any network interface "client," or, more simply, a client.

In most common applications, an incoming communications request from a remote computer system is routed by the network interface software to all possible clients logically associated with the destination computer system. The various clients analyze or interpret the contents of the communications request and, individually, decide whether or not they are the intended recipient of the request. The client who is the intended recipient "owns" the communications request. Once the intended recipient has been identified, that recipient then provides information to the network interface software to allow the network interface software to negotiate specific parameters about the proposed connection with the remote computer which initiated the request. After negotiating the specific parameters for the desired connection, the two computers establish a logical connection, which makes a channel available for the transmission of client data.

Although this procedure is very common and has been used somewhat successfully, it is not without limitations and shortfalls. For example, for a given communication request, the network interface software does not know to which client an incoming communications request belongs until one of the clients identifies itself as the owner. A client knows that it owns a given communications request when specific values in specific fields of the communications request match predetermined identifiers for each client. When these predetermined values match, the client informs the network interface software to accept the incoming call on its behalf. Therefore, using this method, each client must decipher all incoming communications requests until the correct recipient is found. This procedure is time consuming, very inefficient, and very complicated for the clients.

Determining ownership of incoming communications requests is further complicated for clients because not all types of communications requests use similar formatting. Multiple complex formatting rules govern how to search the information contained within a given incoming communications request. For example, if a given client wants to determine whether a given communications request allows voice, that client must understand the complex rules related to transmitting voice data. This means that each client must be knowledgeable about the format of all the possible types of requests that can be received by the destination computer system. If individual clients are not programmed to correctly process all types of requests, a client may inadvertently intercept or ignore a communications request and communication errors can result.

For example, misinterpretation of an incoming communications request can result in a given client mistakenly identifying itself as the owner of the request. The mistake may preclude the establishment of a valid communication connection or link between a remote sender and the correct recipient in a destination computer system. Another result of misinterpreting a communications request can be the abnormal termination of a client, possibly disabling network transmissions to and from that client. These erroneous results occur because all types of communications requests are routed to all clients of the destination computer system's network interface. As more types of communications requests are sent to the same destination computer system, these problems in connection establishment procedures increase in frequency and severity.

An approach to handling problems associated with presently known connection establishment procedures is to attempt to program each client to correctly process each type of communications request that may be received by the destination computer. While technically feasible, the programming of each individual client significantly increases system complexity. More troublesome, however, is that as new types of communications standards are created, continual modification of all clients may be required in order to prevent communication processing errors.

New communications processing standards will continue to cause problems as clients continue to make independent determinations of call ownership. The repetitive modification of communications request processing capabilities in existing clients will increase the programming labor required to support communications. These added programming requirements translate directly to higher costs, delayed implementation of new communications software, and unnecessary constraints in the mix of clients that can be serviced by a given computer system. Without a more effective means for establishing connections for data communications, further process improvements and implementation of new communications techniques will be unnecessarily limited.

DISCLOSURE OF THE INVENTION

According to a preferred embodiment of the present invention, a method and an apparatus for efficiently and accurately processing incoming connection establishment requests is disclosed. The present invention assigns the network interface software, not the clients, to the task of determining ownership of incoming communications requests. Upon receiving an incoming request, the network interface software matches the request to identifying information for each of the clients provided ahead of time by the clients. From this information, the network interface software can determine the correct recipient, establish a call connection on behalf of the owning client, inform the client about the incoming call, and about the connection that has been established.

The present invention eliminates the need for clients to have detailed knowledge of how different types of communications requests are formatted, because incoming communications requests are no longer routed all clients. Clients no longer need to parse incoming communication requests and attempt to determine whether an incoming call is intended for them. As a result, incoming call processing is greatly simplified for each client. Thus, the present invention eliminates the problem of clients mistakenly identifying the ownership of incoming calls. The methods of the present invention will also ultimately shorten the adoption time and costs of implementing new types of communications requests, procedures and protocols, since existing clients will not have to be analyzed and potentially modified with each new type of communications request.

What has been described in this summary, as well as other objects, features, and advantages of the invention will be apparent from the following more particular description of the preferred embodiments of the invention, as illustrated in the accompanying drawings.

BRIEF DESCRIPTION OF THE DRAWINGS

The preferred embodiments of the present invention are described in conjunction with the following drawings, where like designations denote like elements; and.

BEST MODE FOR CARRYING OUT THE INVENTION

The present invention relates to data communications and to establishing communications connections between computers. For those individuals who are not generally familiar with network communications, the Overview section below presents many of the basic concepts and terminology that will help to understand the invention. Individuals skilled in the art of network communications may skip the Overview and proceed directly to the Detailed Description section of this specification.

1. Overview

A computer sends and receives transmissions over a network of telecommunications lines using a hierarchical combination of network interface hardware and software, which provides a logical and physical link to the network. The network interface hardware serves to transmit electrical and optical signals across the communications lines. Tasks performed by the network interface software include establishing communications connections with remote computer systems, routing data to designated recipients, and converting incoming and outgoing data from one format to another.

Network interface software establishes a connection with a remote computer, for network connection protocols like Asynchronous Transfer Mode (ATM), Integrated Services Digital Network (ISDN), and X.25, using "call establishment procedures." A sending computer initially sends the receiving computer a "call establishment request." The request identifies a recipient for which the connection is to be established. Recipients of incoming calls may be applications software, systems software, a utility, a subroutine, or in more general terms, any type of network interface "client." Clients need the assistance of network interface software to negotiate specifics for and to establish connections with the sender of a call establishment request. Upon completion of the call establishment procedures, a data channel becomes available for the transmission of client data between sending and receiving computers.

For instance, for computers to connect using the ATM or ISDN protocols, a call establishment request known as a "SETUP" message is sent to the signaling channel of a receiving computer. A signaling channel carries the control and signaling information that is transmitted across a network. SETUP messages generally include "call characteristics" that define origination and destination numbers, additional addressing information, protocols to be used to process messages, data throughput of the network, and information about whether the connection will contain audio, video, or other forms of data. Call characteristics are used both to identify the owner of an incoming call establishment request and to negotiate specifics for the connection. Network interface software accepts call establishment requests on behalf of clients, and negotiates particular call characteristics in establishing a connection with the sending computer.

Call characteristics using the ATM protocol might include maximum frame size that the sending computer may send and receive with the ATM Adaptation Layer (AAL) 5 parameters. A receiving computer must negotiate with the sender whether this choice is acceptable, based on the receiving computer's hardware and software. If the sending and receiving computers agree on maximum frame size, the resulting transmission becomes more efficient and of higher quality. Another example of a negotiable call characteristic is the use of a specific protocol to send and receive data. Data transfer protocol is specified in fields of the SETUP message called the "Low Layer Information" elements.

Determining ownership of incoming calls can be very complicated because not all types of call establishment requests use identical formatting and because the formatting itself is complex. For instance, to correctly handle ATM call characteristics, processing must support the different formatting and coding rules for all of the possible UNI 3.0, UNI 3.1 and UNI 4.0 signaling protocols. Likewise to correctly handle ISDN call characteristics, processing must handle different formatting for the different possible network or country types, such as National ISDN, Euro-ISDN, etc.

Another example illustrates a further layer of complexity in determining call ownership. For every supported signaling protocol or network type, there are multiple, complex formatting rules that govern how to parse the information contained within an incoming call establishment request. For instance, to determine whether a given call establishment request allows voice, complex rules must be followed for parsing the information element within the call establishment request that contains that call characteristic. Processing must correctly handle all possible types of call characteristics for all the possible types of ATM signaling protocols or ISDN network types that can be received by the computer system.

2. Detailed Description

The present invention allows the network interface software running on a computer system to determine ownership of an incoming call establishment request, and to establish a connection on behalf of the client that owns the call establishment request. Once a connection between the sending and receiving computers has been established, the network interface software on the destination computer informs the client that this procedure has been completed on its behalf In a preferred embodiment of the present invention, the term "signaling provider" is given to the portion of the network interface software that performs the call establishment procedures on behalf of the client. The signaling provider determines ownership of incoming call establishment requests, negotiates to establish connections on behalf of clients, and informs clients when call connections have been established on their behalf. Those skilled in the art will recognize that the signaling provider could be any combination of software and hardware in a computer system which serves these functions. Those skilled in the art will also recognize that "client" can include any type of recipient for which incoming call establishment procedures are required.

In the preferred embodiments of the present invention, to enable the signaling provider to perform call establishment procedures on behalf of each client, each client first informs the signaling provider of what criteria in a call establishment request determines that client to be the owner of the incoming call. Each client also provides the signaling provider with information about what, if any, call characteristics parameters to negotiate in establishing a connection with a sending computer. After all clients have provided this information, the signaling provider can properly handle call establishment procedures on behalf of the clients. Thus the invention moves most of the function, intelligence, logic, and complexity required to filter incoming call establishment requests away from the individual clients and into the signaling provider.

Figure 1:
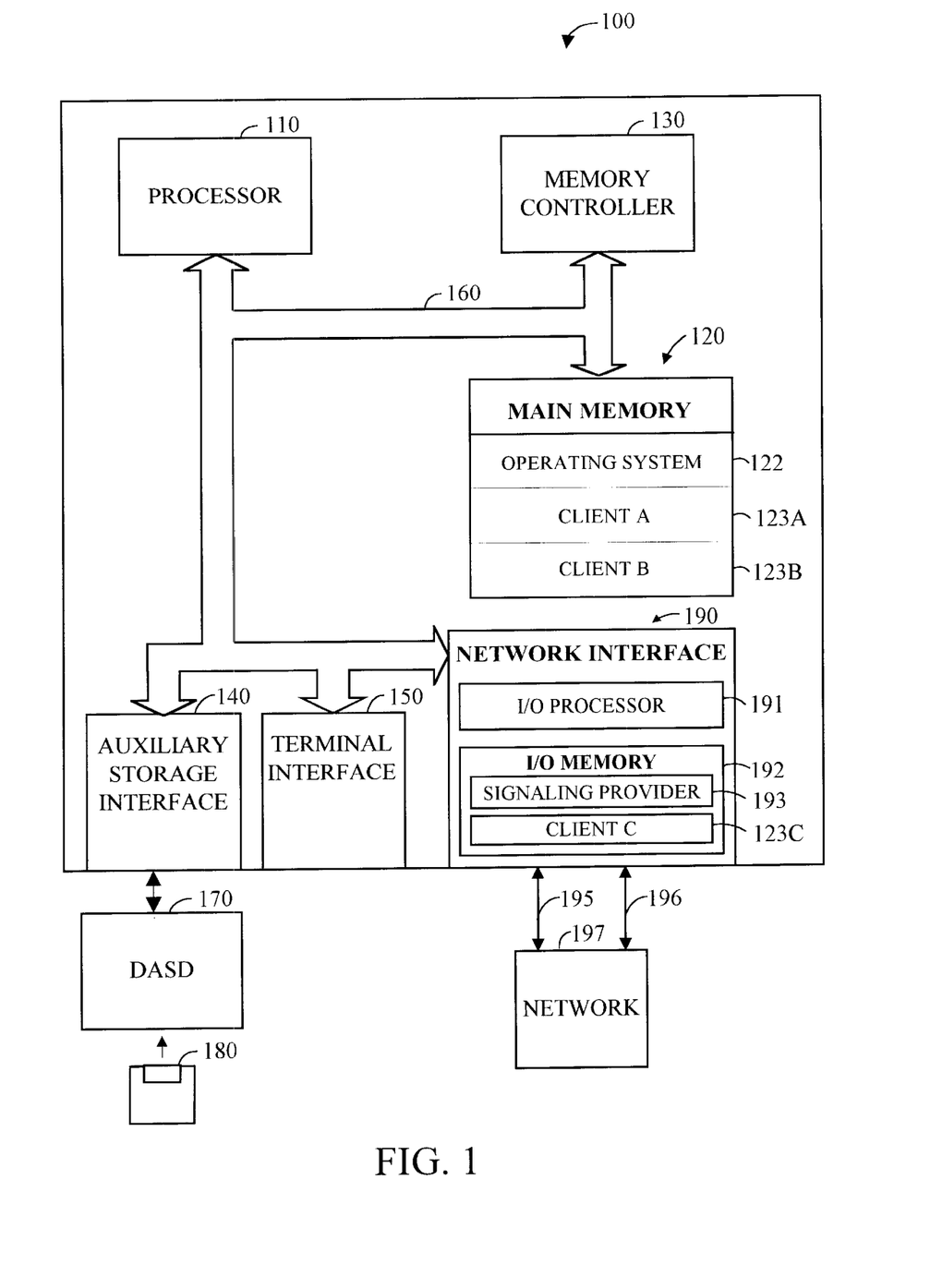
FIG. 1 is a block diagram of an apparatus according to a preferred embodiment of the present invention.

Referring now to FIG. 1, a computer-based system 100 in accordance with a preferred embodiment of the present invention includes an IBM AS/400 or other compatible computer. However, those skilled in the art will appreciate that the methods and apparatus of the present invention apply equally to any computer system, regardless of whether the computer system is a:complicated multi-user computing apparatus or a single user device such as a personal computer or workstation. Computer system 100 suitably comprises a Central Processing Unit (CPU or processor 110), main memory 120, a memory controller 130, an auxiliary storage interface 140, a terminal interface 150, and a network interface 190, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100. Those skilled in the art will recognize that there are many possible computer systems which are suitable for use with the present invention.

Processor 110 performs computation and control functions of computer system 100, and comprises a suitable central processing unit (CPU). Processor 110 may comprise a single integrated circuit, such as a microprocessor, or may comprise any suitable number of integrated circuit devices and circuit boards working in cooperation to accomplish the functions of a processor. Processor 110 suitably executes within main memory 120 "clients" 123 that receive transmissions from network 197. It is important to note that client 123 may be a computer applications program, systems software, a utility, a subroutine, or any computer code which can be the recipient of incoming call establishment requests.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as hard disks, floppy disks (e.g., disk 180) and CD ROMS, and transmission type media such as digital and analog communication links, including wireless communication links.

Memory controller 130, through use of a processor (not shown) separate from processor 110, is responsible for moving requested information from main memory 120 and/or through auxiliary storage interface 140 to processor 110. While memory controller 130 is shown as a separate entity for purposes of explanation, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bidirectional communication in a computer-related environment could be used.

Network interface 190 supports the transfer of information between clients 123 and remote computer systems in network 197. Network interface 190 suitably contains I/O processor 191 and I/O memory 192. Network interface 190 is preferably implemented as an expansion card that can easily be added to computer systems such as computer system 100. Examples include Peripheral Component Interconnect (PCI) expansion cards and Industry Standard Architecture (ISA) expansion cards. Those skilled in the art will recognize that the functionality of network interface 190 can be implemented directly as part of main memory 120 and processor 110

In the preferred embodiment of the present invention, I/O memory 192 suitably contains signaling provider 193 and client 123C. While signaling provider 193 is shown residing in I/O memory 192 and being performed by I/O processor 191, those skilled in the art will recognize that all or portions of signaling provider 193 can reside in main memory 120 and be performed by processor 110. Those skilled in the art will also recognize that clients 123 can also exist in main memory 120, or in any other memory accessible by computer system 100.

Signaling link 195 and data link 196 provide physical connections between network interface 190 and network 197. Signaling link 195 is the channel over which connections are established. Data link 196 is the channel over which data is sent once a connection is established.

Signaling provider 193 performs the call establishment procedures on behalf of clients 123. Signaling provider 193 thus determines ownership of call establishment requests incoming over signaling link 195, negotiates connection parameters with the sending computer in network 197 over signaling link 195, and informs an owning client 123 when a call connection has been established with the sending computer in network 197 on data link 196.

The preferred embodiment for signaling link 195 and data link 196 are any suitable communication mechanism to network 197, including a hardwired connection, telephone access via a modem or high-speed T1 line, infrared or other wireless communications, computer network communications (whether over a wire or wireless), or any other suitable connection between computers, whether currently known or developed in the future. For example, for ISDN and ATM, signaling link 195 and data link 196 are separate time division multiplexed channels which flow over a common wire. For X.25, signaling link 195 and data link 196 flow over the same, shared Logical Channel Identifier (LCN). Everything associated with a specific call (data, call establishment, and control) flows in separate "packets" over a particular logical channel. Within that logical channel, the type of packet is differentiated by a field in the packet header called the "Packet Type Identifier." Thus the separation of the data and signaling links for a specific call could be thought of as 2 levels of logical channelization.

Main memory 120 suitably contains an operating system 122, and at least one client 123. Operating system 122 in memory 120 is used to control the functional operation of system 100. Client 123 suitably shares one or more network resources 197 with other clients, such as a telecommunications line using a protocol like ATM, ISDN, X.25, or Switched Frame Relay. Client 123 is a potential recipient of call establishment requests incoming over signaling link 195.

Although shown as separate components for this example, the various components shown in main memory 120 may alternatively be individual parts of a single software program. The various components loaded into main memory 120 are typically loaded from a secondary storage location such as DASD 170. The term "memory" as used herein refers to any storage location in the virtual memory space of system 100. It should be understood that main memory 120 does not necessarily contain all parts of all mechanisms shown at all times. For example, portions of operating system 122 may be loaded into an instruction cache (not shown) for processor 110 to execute, while other files may well be stored on magnetic or optical disk storage devices (not shown) until they are needed.

Figure 2:
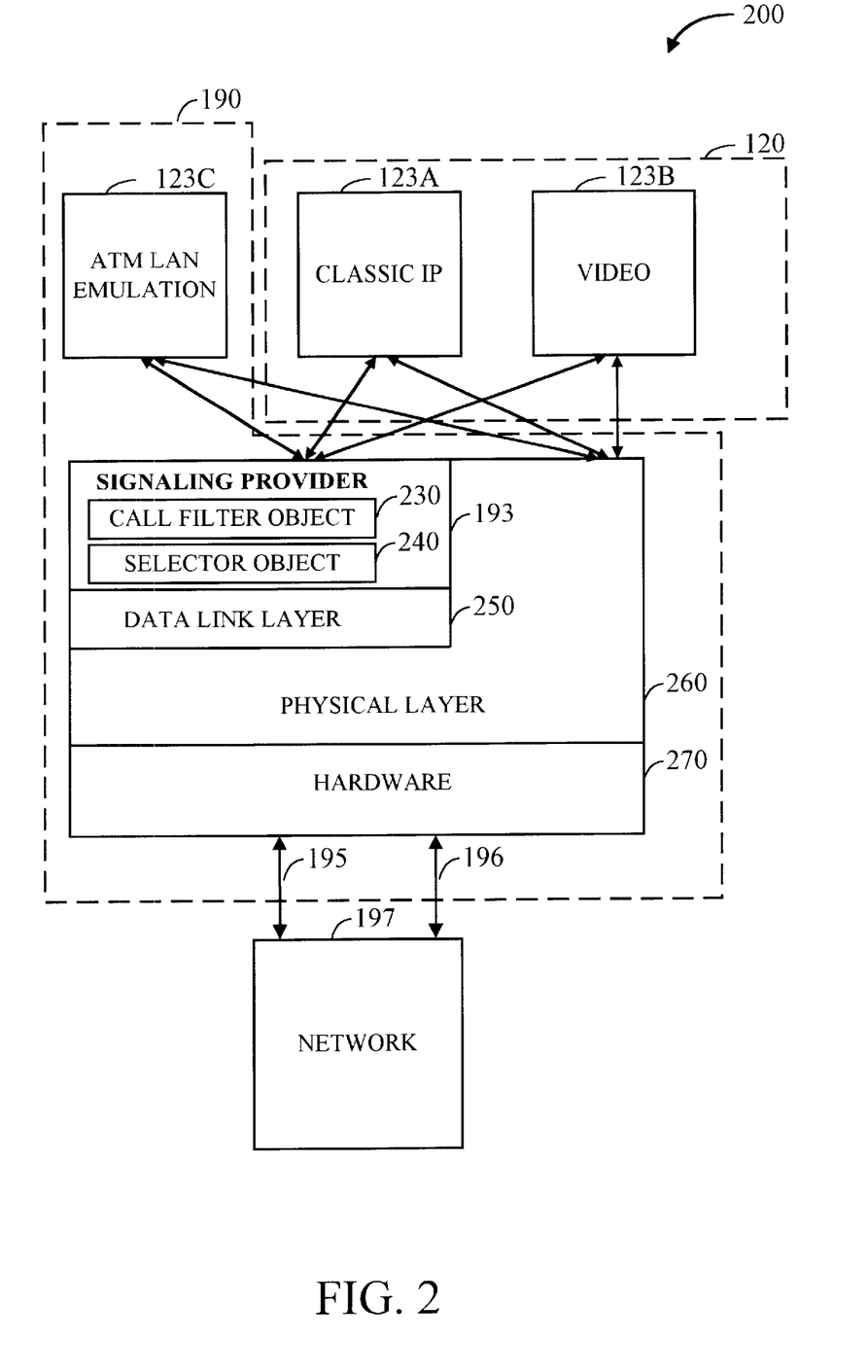
FIG. 2 is a block diagram depicting a configuration in which multiple clients, each receiving differing types of call establishment requests, share a single network resource.

Referring now to FIG. 2, a diagram 200 of how clients 123, within main memory 120 and within network interface 190, must share a single network resource 197, via network interface 190, is depicted. Client 123 can be an application over ATM, such as LAN emulation 123C, classic Internet Protocol (IP) 123A, or video 123B. Those skilled in the art will understand that client 123 can be any recipient of any kind of incoming call establishment request that now exists or is invented in the future.

A preferred embodiment of network interface 190 includes a signaling provider 193, a data link layer 250, a physical layer 260, and a hardware layer 270 which, in concert, process call establishment requests incoming via signaling link 195 to network 197. In the preferred embodiment, network interface 190 also suitably contains client 123C, ATM LAN Emulation.

Signaling provider 193 determines ownership of call establishment requests incoming on signaling link 195 from sending computers in network 197. Signaling provider 193 establishes connections on data link 196 with senders in network 197 on behalf of client 123. Signaling provider 193 subsequently informs client 123 that a call connection has been established on data link 196, and of call characteristics that have been negotiated for the connection.

In the preferred embodiment of the present invention, signaling provider 193 is implemented as an object, that is both the creator of and a container of call filter object 230. Signaling provider 193 is thus a factory for call filter object 230. Through signaling provider 193, each client 123 creates call filter object 230. Call filter object 230 describes to signaling provider 193 how to filter (route, accept, or reject) incoming calls for client 123. Call filter object 230 represents a boolean expression that allows signaling provider 193 to compare the criteria in selector object 240 with incoming call establishment requests.

In the preferred embodiment of the present invention, call filter object 230 is implemented as an object that is both the creator of and a container of selector object 240. Call filter object 230 is thus a factory for selector object 240. Client 123 invokes methods on call filter object 230 to create selector object 240. By invoking AND and OR methods on selector object 240, multiple selector objects 240 become chained together in a way which replicates the desired boolean relationship required for call filter object 230.

Those skilled in the art will recognize that although the most preferred embodiment of the present invention has been implemented using object-oriented programming and the related object-oriented techniques, many programming language and computer program can accomplish the equivalent of what is referred to as an object.

Data link layer 250 provides error control and synchronization for transmissions. Physical layer 260 conveys transmitted data through hardware 270, to and from signaling link 195 and data link 196 to network 197. Client 123 also interfaces with physical layer 260 during incoming and outgoing transmissions over data link 196 once a call connection has been established by signaling provider 193.

Network 197 represents any type of network known to those skilled in the art. This includes the Internet, Intranets, Local Area Networks (LAN), or any configuration of hardware and software, currently known or developed in the future, by which computer systems communicate with each other.

Figure 3:
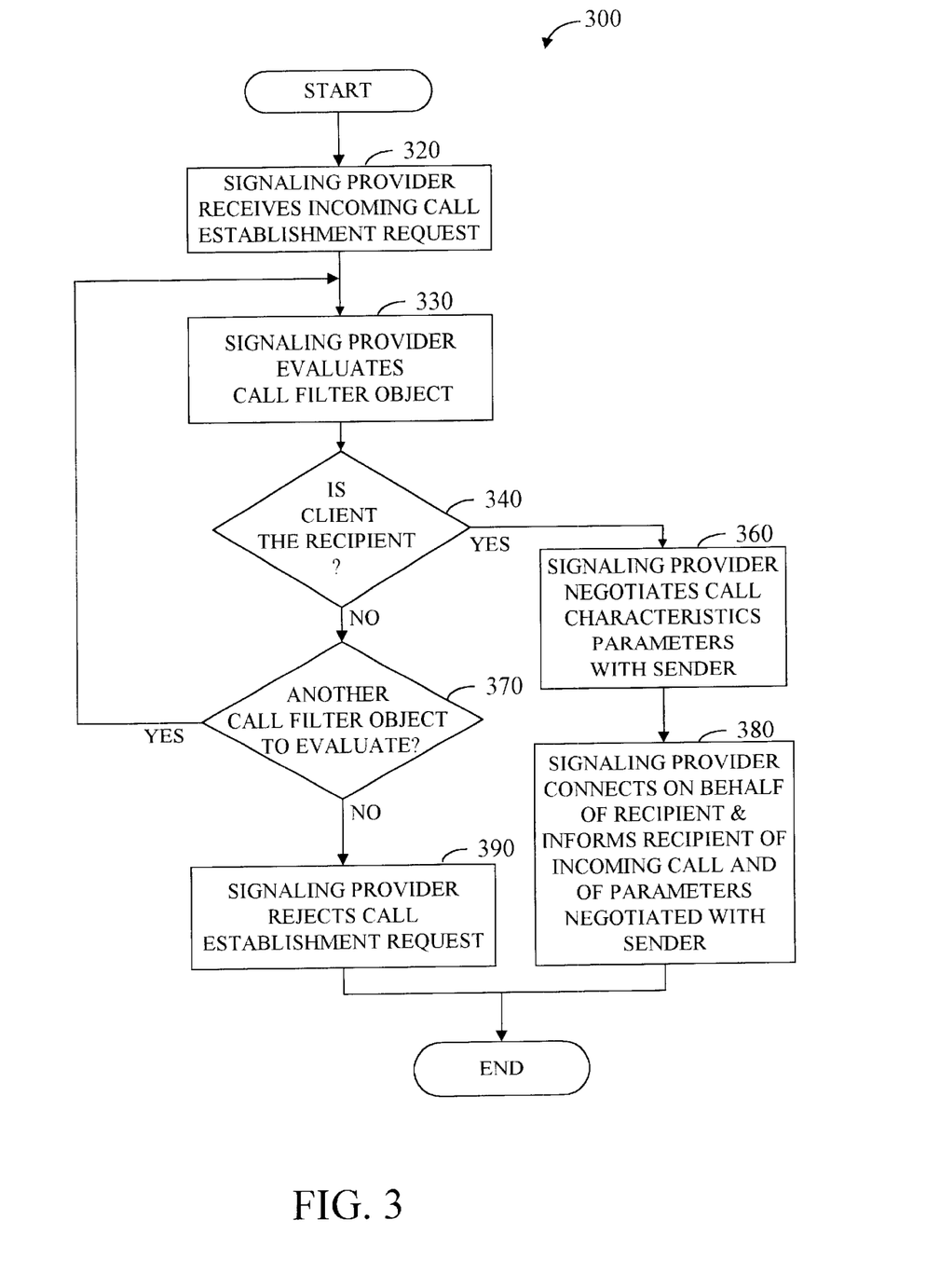
FIG. 3 is a flowchart depicting a method for establishing call connections according to a preferred embodiment of the present invention.

Referring now to FIG. 3, a method 300 to determine ownership of call establishment requests and to establish connections on behalf of clients according to the preferred embodiment of the invention is depicted. Method 300 is used whenever signaling provider 193 receives an incoming call establishment request (step 320). Signaling provider 193 evaluates the boolean expression represented by call filter object 230 (step 330) to determine whether client 123 associated with call filter object 230 owns the incoming call establishment request (step 340="YES"). If client 123 is not the owner of the call establishment request (step 340="NO"), then signaling provider 193 checks another client's call filter object 230 object (step 370="YES"). If the boolean expressions represented by call filter objects 230 have all been evaluated (step 370="NO"), signaling provider 193 rejects the incoming call and does not inform any client about the call establishment request (step 390).

On the other hand, if signaling provider 193 determines that one of client 123 is the owner of the incoming call establishment request (step 340="YES"), then signaling provider 193 negotiates call characteristics parameters with the sending computer based on call characteristics parameters in selector object 240 contained in call filter object 230 (step 360). Once signaling provider 193 negotiates call characteristics parameters with sender, signaling provider 193 establishes the call connection, informs client 123 that a call connection has been established on its behalf, and provides client 123 any data about the call connection that client 123 requested via call filter object 230 (step 380).

Figure 4:
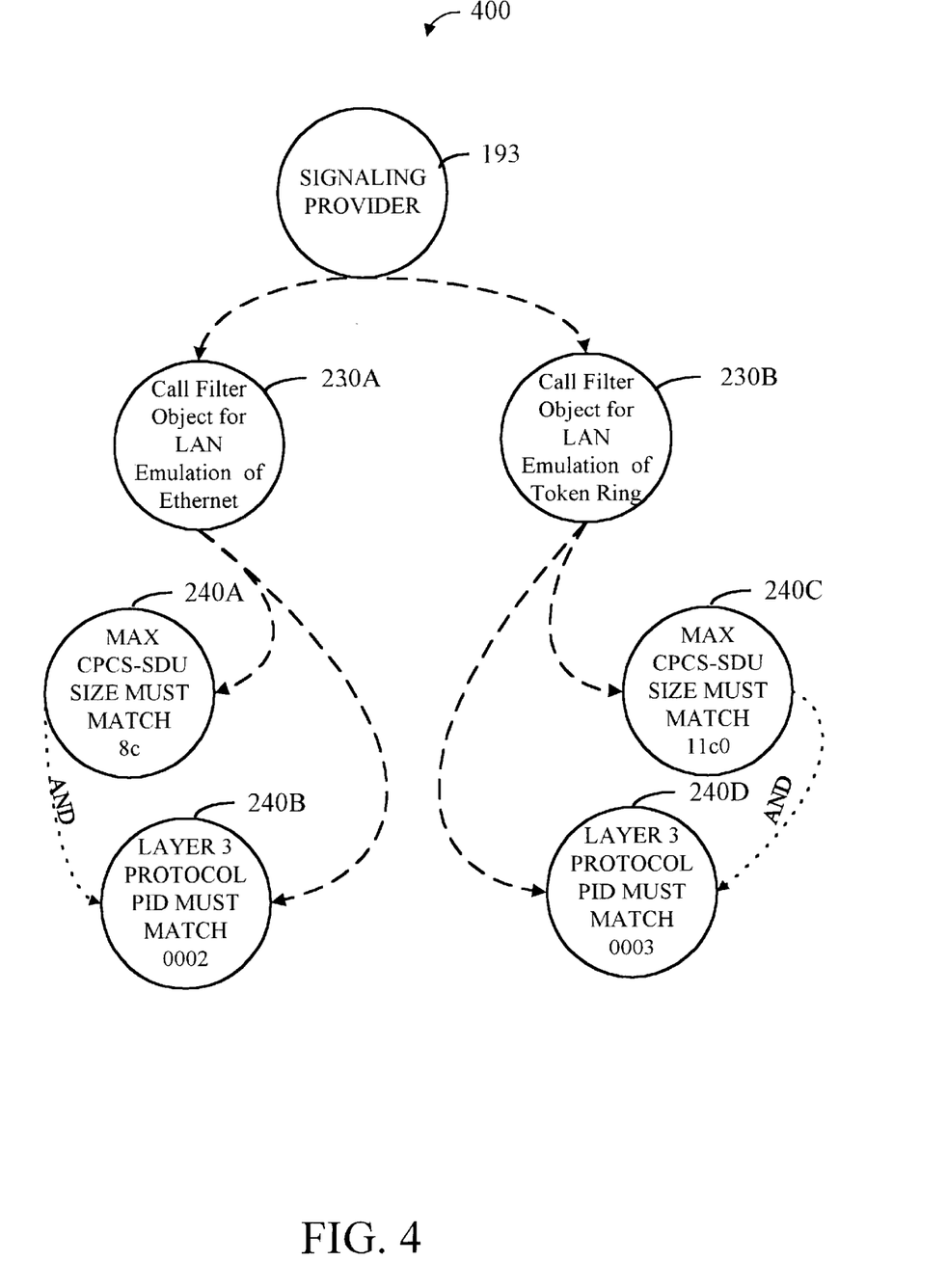
FIG. 4 is a diagram depicting call filter objects according to a preferred embodiment of the present invention which are used by the signaling provider to determine ownership of incoming call establishment requests.

Referring now to FIG. 4, an example diagram 400 of two call filter objects 230 available to signaling provider 193 is depicted. Call filter object 230A is associated with a client running LAN Emulation of Ethernet. Call filter object 230B is associated with a client running LAN Emulation of Token Ring. Signaling provider 193 evaluates the boolean expressions represented by call filter objects 230 to determine ownership of each incoming call establishment request. If one of the clients owns the call establishment request, signaling provider 193 negotiates parameters with the sender and establishes a connection on behalf of the owner.

In the preferred embodiment of the present invention, both call filter objects 230 contain chains of selector objects 240. Call filter object 230 represents a boolean expression that tells signaling provider 193 how to evaluate a chain of selector objects 240. Selector object 240 may contain criteria that a client expects to be on an incoming call establishment request when that client is the owner of the incoming call. Alternatively, selector object 240 may contain information about what parameters signaling provider 193 should negotiate with the sending computer in establishing a connection. Finally, selector object 240 may define what information should be routed to the owner client after signaling provider 193 has established a connection on its behalf. Signaling provider 193 follows the chain of selector objects 240 asking each selector object 240 in the chain if it has call criteria that match that of an incoming call establishment request.

In the preferred embodiment, signaling provider 193 evaluates the boolean expression in call filter object 230A. In following the chain of selector objects 240, signaling provider 193 determines whether the Forward Maximum CPCS-SDU Size matches hexadecimal "8c" 240A, and whether Broadband Low Layer 3 PID matches "0002" 240B. Since the selector objects 240A and 240B are AND'ed together, both these criteria must match for the incoming call establishment request to belong to the client associated with call filter object 230A.

If the boolean expression is not true, that is both these conditions are not found in the incoming call establishment request, then signaling provider 193 does nothing further on behalf of the client associated with call filter object 230A. Instead, signaling provider 193 evaluates the boolean expression represented by call filter object 230B. In evaluating the boolean expression represented by call filter object 230B, signaling provider 193 determines whether the Forward Maximum CPCS-SDU Size matches hexadecimal "11c0" 240C and whether Broadband Low Layer 3 PID matches "0003" 240D. Since the selector objects 240C and 240C are AND'ed together, both these criteria must match for the incoming call establishment request to belong to the client associated with call filter object 230B.

If signaling provider 193 finds the boolean expression represented by call filter object 230 is true, then signaling provider 193 accepts the call on behalf of the client associated with call filter 230. When accepting the incoming call, signaling provider 240 sends an appropriate response and negotiates connection parameters with the sender based on selector objects 240 in the chain which specify which connection parameters are negotiable. Signaling provider saves an indication of what is negotiated and the negotiated values, so that this information may later be returned to the client that created call filter 230.

Figure 5:
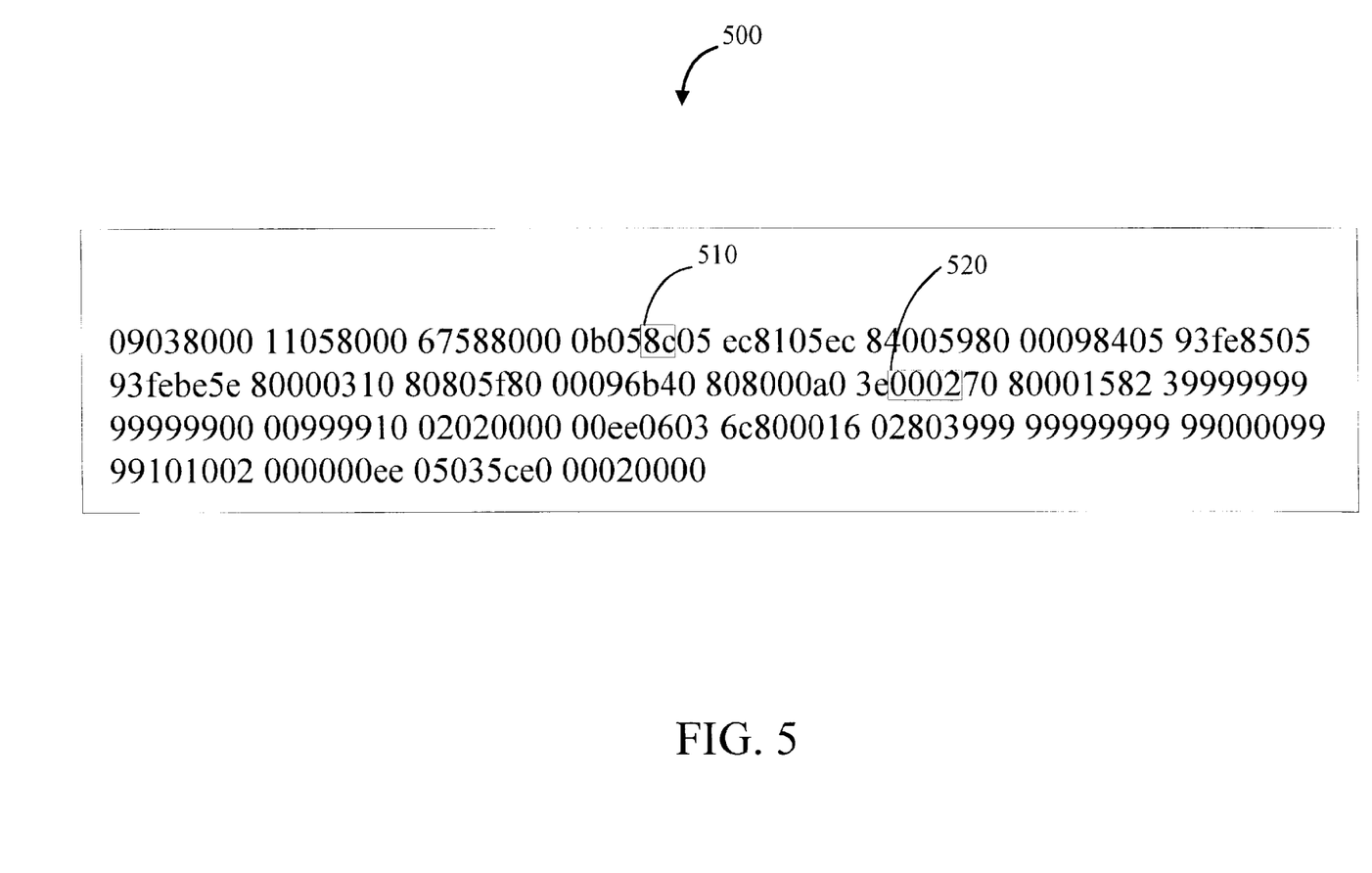
FIG. 5 is an example of an incoming ATM SETUP message for a LAN Emulation Ethernet data call.

Referring now to FIG. 5, an example of an incoming ATM SETUP message 500 for a LAN Emulation Ethernet data call is depicted. Upon receiving this call establishment request, the signaling provider evaluates the boolean expressions represented by each call filter object in search of the owner of the incoming call. When examining the call filter object associated with LAN Emulation of Ethernet, the signaling provider finds that both Forward Maximum CPCS-SDU Size field matches "8c" 510 AND Broadband Low Layer 3 PID field matches "0002" 520. Thus the signaling provider determines that the incoming call establishment request is intended for LAN Emulation of Ethernet and establishes a call connection on that client's behalf.

Figure 6:
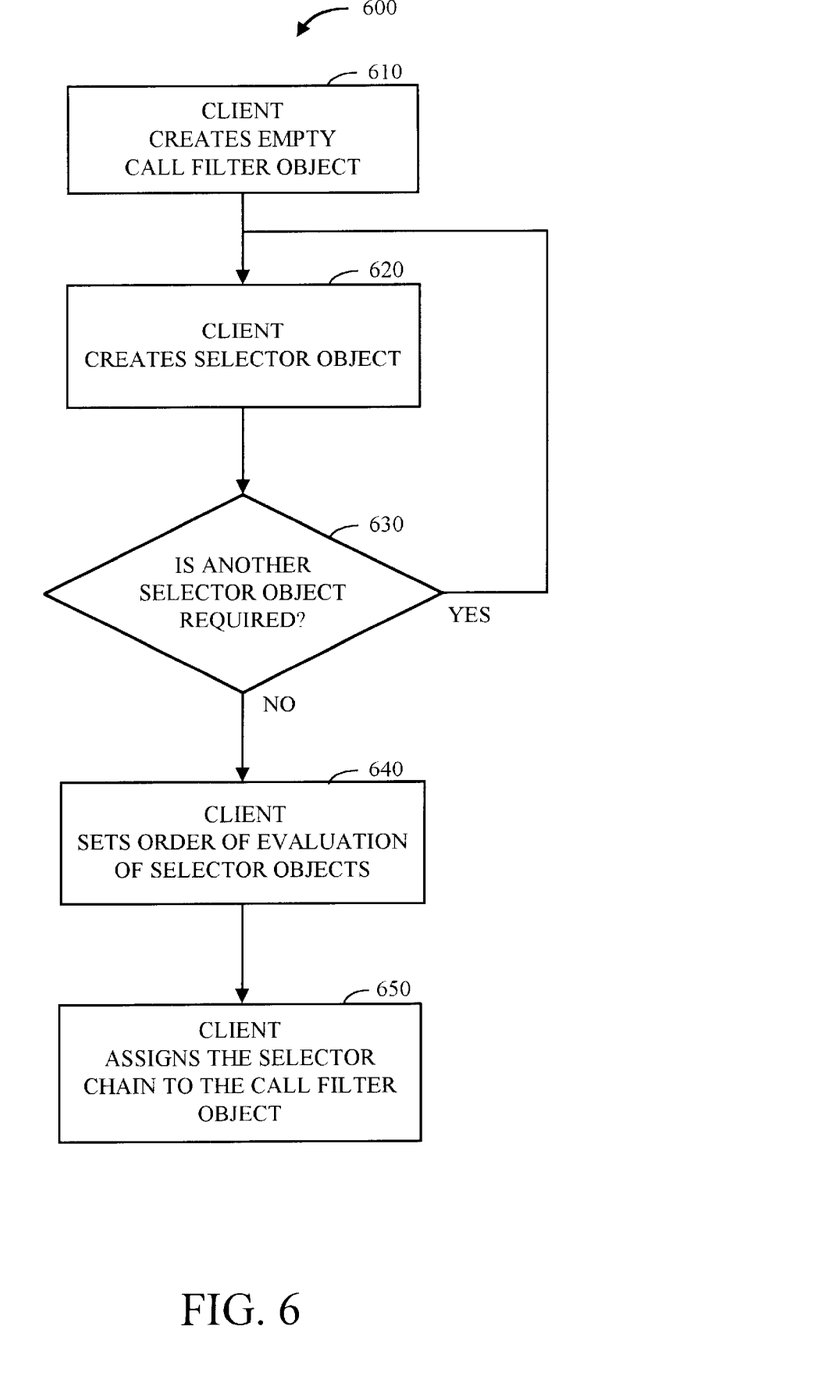
FIG. 6 is a flowchart depicting a method according to a preferred embodiment of the present invention whereby clients create call filter objects according to the preferred embodiment of the present invention.

Referring now to FIG. 6, a method 600 for clients to create call filter objects according to the preferred embodiment of the invention is depicted. Method 600 is used as an initialization process, in which all clients create call filter objects for signaling provider 193 to compare with incoming call establishment requests. Once every client completes this initialization process, then signaling provider can determine ownership of incoming call establishment requests, and establish connections for every client.

Client 123 first creates an empty call filter object 230 (step 610). Client 123 then creates a selector object 240 for the comparison of an information element with incoming call establishment requests (step 620). Client 123 conveys in selector objects 240 how to compare the assigned selector information to the call establishment request message by setting one of the following relations: "must match," "must not match," "must be present," "must not be present," or "must be within specified ranges of target values."

Client 123 may also create a selector object 240 to specify a connection parameter for signaling provider 193 to negotiate with a sending computer. Further, client 123 may create a selector object to indicate to signaling provider 193 that certain information from the call establishment request, or about the established connection, should be passed to client 123, when signaling provider informs client 123 about an incoming call. Thus client 123 may have to assign data to multiple selector objects 240 in order to fully identify to signaling provider 193 all information necessary to determine ownership of an incoming call, and to direct signaling provider's 193 actions once client 123 is determined to be the owner of the incoming call (step 630="YES").

After client 123 has created all necessary selector objects 240, client 123 sets the order of evaluation of selector objects 240 (step 640). Each selector object 240 has its own AND chain and its own OR chain. To conjunctively chain a selector object 240 with a second selector object 240, the address of the second selector object is placed at the end of the first selector object's AND chain. If a selector object's AND chain is zero, it is not conjunctively chained to any other selector object. Likewise, to disjunctively chain a selector object 240 with a second selector object 240, the address of the second selector object is placed at the end of the first selector object's OR chain. If a selector object's OR chain is zero, it is not disjunctively chained to any other selector object. Once client 123 has set the AND chains and OR chains in each selector, the resulting chained selector objects are the equivalent of a boolean expression. The completed selector chain is then assigned to call filter object 230 by client 123 (step 650).

Figure 7:
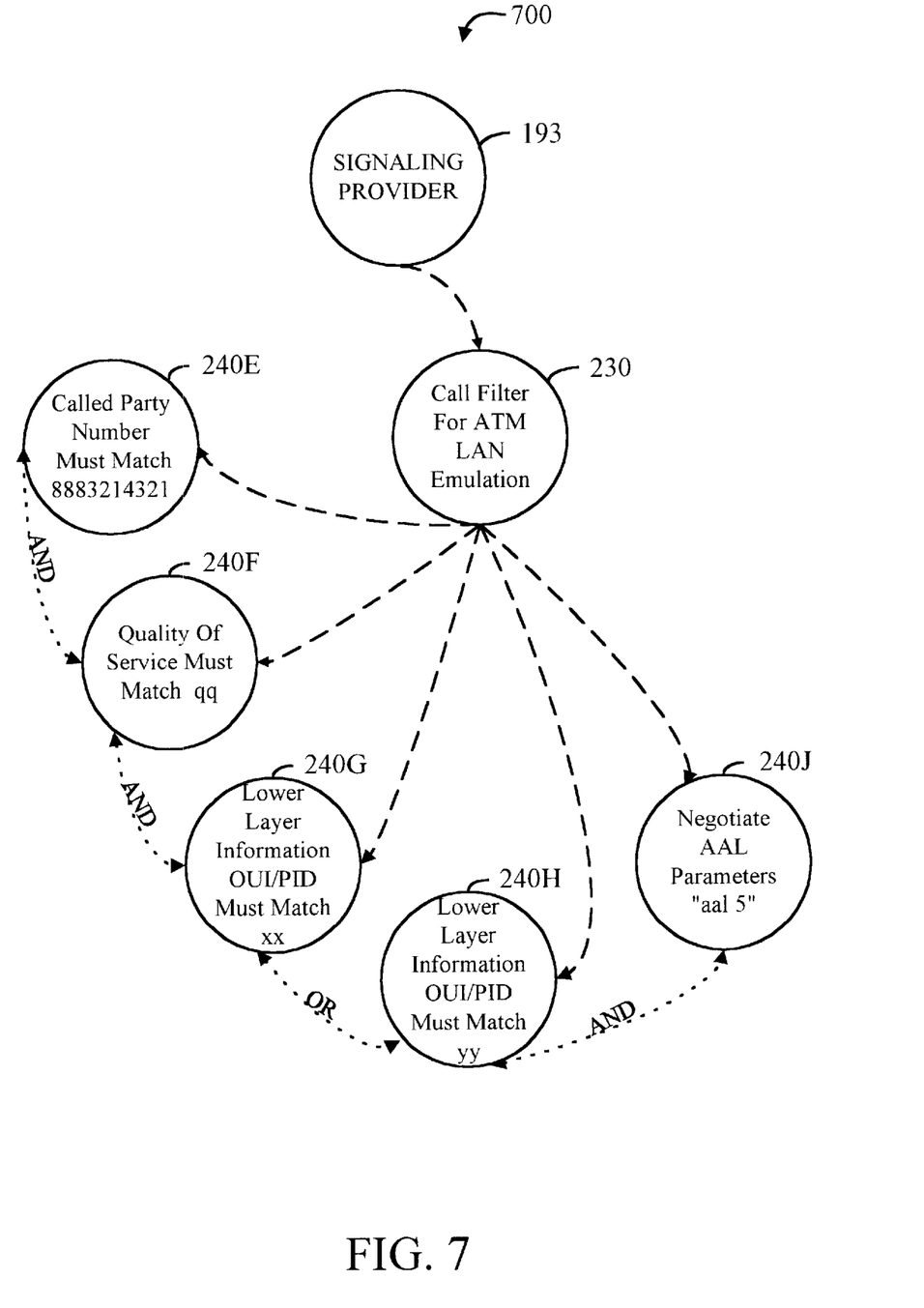
FIG. 7 is a diagram depicting a specific example of a call filter object according to a preferred embodiment of the present invention.

Referring now to FIG. 7, a diagram 700 depicts an example of selector objects 240 contained in call filter object 230. Each selector object 240 provides specific values of information elements to compare to the call characteristics of incoming call establishment request messages. The client associated with call filter object 230 owns an incoming call when the data assigned in selector objects 240 matches the characteristics of the incoming call.

In this example, selector object 240E is set to require that Called Party Number Information Element match "8883214321." The Called Party Number is the network number at which the incoming call was received. Selector object 240F is set to require that the Quality of Service Information Element match "qq." The AND chain in selector object 240E contains the address of selector 240F, chaining the two selector objects together conjunctively. The OR chain in selector object 240E contains zero, indicating there is no selector object 240 to which selector object 240E is disjunctively chained.

The AND chain in selector object 240F contains the address of selector object 240G; the OR chain in selector object 240F contains zero. Selector object 240G's AND chain contains the address of selector object 240J; however, selector object 240G's OR chain does not contain zero. Selector 240G's OR chain contains the address of selector object 240H, which chains selector objects 240G and 240H together disjunctively. When selector object 240 contains addresses of other selector objects in both its AND chain and its OR chain, the selector objects 240 which are disjunctively chained together are processed first. If the criteria in either disjunctively chained selector object 240 is true, then the conjunctive chain is followed and evaluated.

In the most preferred embodiment, selector objects 240G and 240H require Broadband Low Layer Information with OUI/PID match either "xx" or "yy" respectively. The low layer information element provides a means for ATM end-users to determine whether they are using compatible protocols, layer 3 window sizes, layer 3 packet sizes, and other user-dependent parameters before they connect.

Besides assigning data which identifies ownership of an incoming call establishment request, selector object 240 can be used to indicate what call characteristics parameters to negotiate with a sending computer. For example, selector object 240J is set to indicate that ATM Adaptive Layer (AAL) 5 forward and backward maximum frame sizes are negotiable. If sender and receiver can agree to use these frame sizes, the resulting transmission will be more efficient and of higher quality.

In the preferred embodiment of the present invention, selector objects 240 are chained together to require all of the following criteria: Called Party Number must match 8883214321, Quality of Service must match "qq," Broadband Low Layer OUI/PID must match either "xx" or "yy," and the AAL parameter, "aal 5" is to be negotiated with the sender before establishing a call connection.

Figure 8:
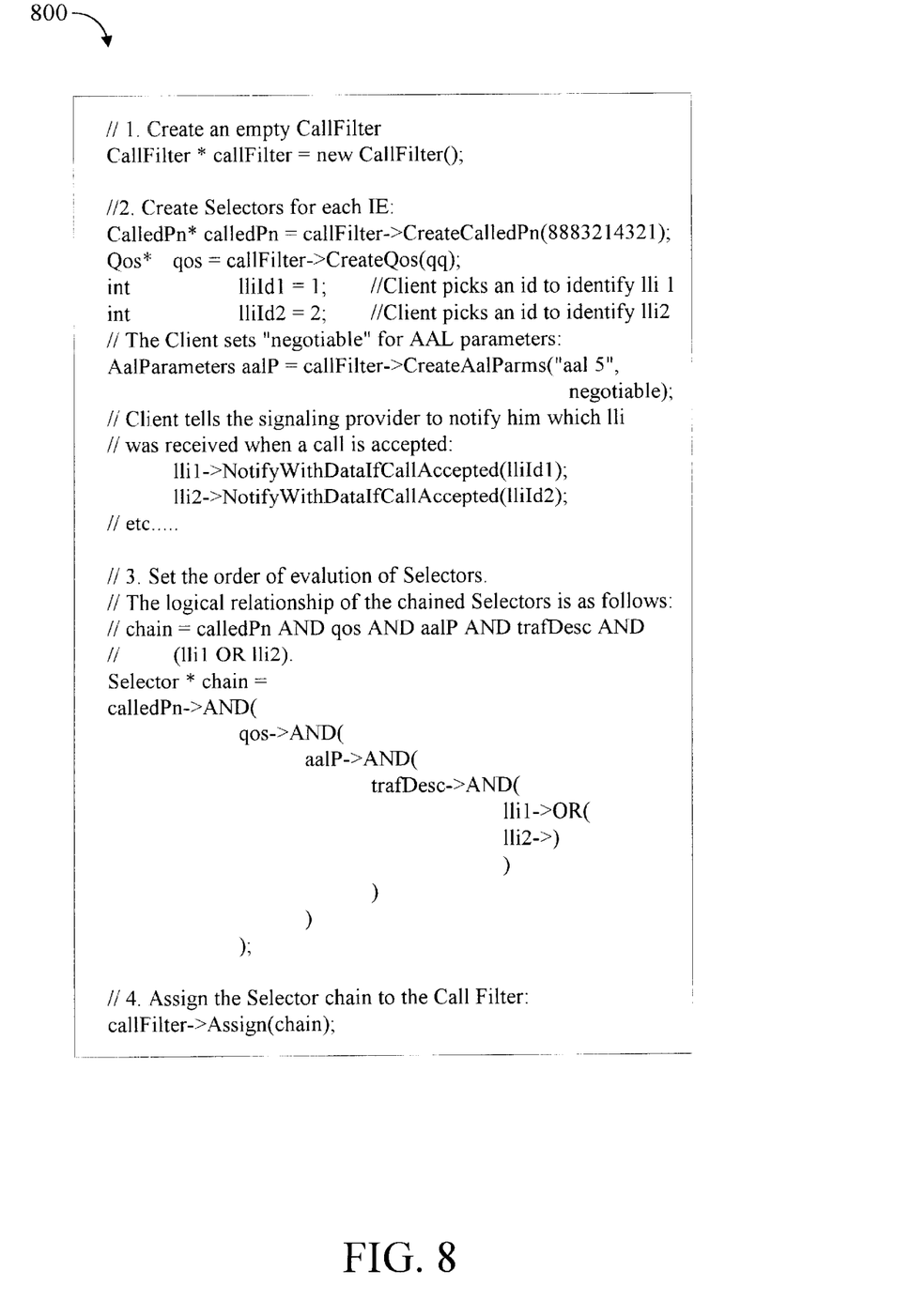
FIG. 8 is an example of computer code in C++ programming language depicting the creation of a call filter object according to a preferred embodiment of the present invention.

Referring now to FIG. 8, the creation of a call filter object in C++ computer code is depicted. In the preferred embodiment, a client creates an empty call filter object, then creates selector objects for each information element. One selector is assigned to indicate that signaling provider should negotiate the AAL parameter "aal 5" with the sender. A selector is also set to have the signaling provider inform the owning client which of the Broadband Low Layer Information Elements is present on an incoming call establishment request. After creating all the selector objects, the client sets the order of evaluation of selectors. Finally, the client assigns the selector chain to the call filter.

In summary, the present invention allows the clients to create selector objects and combine them into call filters to provide the signaling provider with sufficient information to perform call establishment procedures on their behalf Upon receiving incoming call establishment requests, the signaling provider evaluates the boolean expressions represented by each call filter until an owner is determined. If an owner is identified, the signaling provider further uses the information contained in the selector objects to negotiate call parameters with the sending computer. Once a connection is established, the signaling provider informs the owning client of the connection, of any criteria that was negotiated in the process, and of specifics from the call establishment request.

While the invention has been particularly shown and described with reference to the preferred embodiments thereof, it will be understood by those skilled in the art that various changes in form and details may be made therein without departing from the spirit and scope of the invention.

What is claimed is:

1. An apparatus comprising:
   at least one processor;

a memory coupled to the at least one processor;

at least one call filter object residing in the memory; and a signaling provider residing in the memory, the signaling provider determining ownership of at least one incoming call establishment request, said ownership being determined for a client amongst a plurality of clients and based upon information supplied by said plurality of clients, wherein the signaling provider uses the at least one call filter object to negotiate connection parameters with a computer that sent the at least one incoming call establishment request.

2. The apparatus of claim 1 wherein the signaling provider uses the at least one call filter object to determine ownership of the at least one incoming call establishment request.

3. The apparatus of claim 2, wherein the signaling provider uses the at least one call filter object to identify what information about the at least one incoming call establishment request to route to an owner of the at least one incoming call establishment request.

4. The apparatus of claim 2 wherein the at least one call filter object comprises at least one selector object.

5. The apparatus of claim 4 wherein the at least one selector object describes at least one call characteristic for determining ownership of the at least one incoming call establishment request.

6. An apparatus comprising:

at least one processor;

a memory coupled to the at least one processor;

a signaling provider residing in the memory, the signaling provider determining ownership of at least one incoming call establishment request, said ownership being determined for a client amongst a plurality of clients; and at least one call filter object residing in the memory, wherein the signaling provider uses the at least one call filter object to determine ownership of the at least one incoming call establishment request, said call filter object comprising information supplied by said plurality of clients, wherein the signaling provider uses the at least one call filter object to negotiate connection parameters with a computer that sent the at least one incoming call establishment request.

7. The apparatus of claim 6 wherein the at least one call filter object comprises at least one selector object.

8. The apparatus of claim 7 wherein the at least one selector object describes at least one call characteristic for determining ownership of the at least one incoming call establishment request.

9. The apparatus of claim 7 wherein each of the at least one call filter objects comprises a plurality of selector objects.

10. The apparatus of claim 9 wherein each of the plurality of selector objects describes at least one call characteristic for determining ownership of the at least one incoming call establishment request.

11. An apparatus comprising:

at least one processor;

a memory coupled to the at least one processor;

a plurality of call filter objects residing in the memory, each of the plurality of call filter objects comprising at least one selector object each of the at least one selector objects describing at least one call characteristic for determining ownership of at least one of a plurality of incoming call establishment requests, said ownership being determined for a client amongst a plurality of clients; and a signaling provider residing in the memory, wherein the signaling provider uses at least one of the at least one call filter objects to determine ownership of at least one of the plurality of incoming call establishment requests, said call filter objects comprising information provided by said plurality of clients, wherein the signaling provider uses at least one of the at least one of the plurality of call filter object to negotiate connection parameters with a computer that sent at least one of the plurality of incoming call establishment requests.

12. A method comprising the steps of:

receiving at least one incoming call establishment request;

using a signaling provider to determine ownership of the at least one incoming call establishment request, said ownership being determined for a client amongst a plurality of clients and based upon information supplied by said plurality of clients, and using said information to negotiate connection parameters with a computer that sent the at least one incoming call establishment request.

13. The method of claim 12 wherein the step of using a signaling provider to determine ownership of the at least one incoming call establishment request comprises the step of using at least one call filter object to determine ownership of the at least one incoming call establishment request.

14. The method of claim 13 wherein the step of using at least one call filter object to determine ownership of the at least one incoming call establishment request comprises the step of using at least one selector object to determine ownership of the at least one incoming call establishment request.

15. The method of claim 12 wherein the step of using a signaling provider to determine ownership of the at least one incoming call establishment request comprises the step of using a plurality of call filter objects to determine ownership of the at least one incoming call establishment request.

16. The method of claim 15 wherein the step of using the plurality of call filter objects to determine ownership of the at least one incoming call establishment request comprises the step of using a plurality of selector objects to determine ownership of the at least one incoming call establishment request.

17. The apparatus of claim 15 wherein the step of using the plurality of call filter objects to determine ownership of the at least one incoming call establishment request comprises the step of using a plurality of selector to determine ownership of the at least one incoming call establishment request.

18. A method comprising the steps of:

receiving a first incoming call establishment request; and using a signaling provider to determine ownership of the first incoming call establishment request, said ownership being determined for a client amongst a plurality of clients and based upon information supplied by said plurality of clients, and using said information to negotiate connection parameters with a computer that sent the first incoming call establishment request.

19. The method of claim 18 further comprising the steps of:

receiving a second incoming call establishment request; and using the signaling provider to determine ownership of the second incoming call establishment request.

20. The method of claim 19 wherein the step of using the signaling provider to determine ownership of the first or the second of the plurality of incoming call establishment requests comprises the step of using at least one call filter object to determine ownership of the first or the second incoming call establishment request.

21. The method of claim 19 wherein the step of using at least one call filter to determine ownership of the first or the second of the plurality of the incoming call establishment requests comprises the step of using at least one selector object to determine ownership of the first or the second incoming call establishment request.

22. A method comprising the steps of:
receiving a first call establishment request;
using a signaling provider to determine ownership of the first call establishment request;
receiving a second call establishment request; and
using the signaling provider to determine ownership of the second of the plurality of incoming call establishment requests, said ownership being determined for a client amongst a plurality of clients and based upon information supplied by said plurality of clients, and
using said information to negotiate connection parameters with a computer that sent said second of the plurality of incoming call establishment requests.

23. The method of claim 22 wherein the step of using the signaling provider to determine ownership of the first or the second call establishment request comprises the step of using at least one call filter object to determine ownership of the first or the second call establishment request.

24. The method of claim 23 wherein the step of using at least one call filter to determine ownership of the first or the second call establishment requests comprises the step of using at least one selector object to determine ownership of the first or the second call establishment requests.

25. A method comprising the steps of:
receiving at least one incoming call establishment request from a computer system;
using a signaling provider to determine ownership of the at least one incoming call establishment request, said ownership being determined for a client amongst a plurality of clients and based upon information supplied by said plurality of clients;
using the signaling provider to further use said information to negotiate connection parameters with the computer system that sent the at least one incoming call establishment request;
establishing a communication link with the computer system on behalf of said client; and
informing said client, that a connection has been established on behalf of said client.

26. The method of claim 25 wherein the step of using a signaling provider to determine ownership of the at least one incoming call establishment request comprises the step of using at least one call filter object to determine ownership of the at least one incoming call establishment request.

27. The method of claim 26 wherein the step of using at least one call filter object to determine ownership of the at least one incoming call establishment request comprises the step of using at least one selector object to determine ownership of the at least one incoming call establishment request.

28. The method of claim 25 wherein the step of establishing a communication link on behalf of said client comprises the step of negotiating at least one connection parameter with the computer system.

29. The method of claim 25 wherein the step of informing the owner of the at least one incoming call establishment request that a communication link has been established comprises the step of transferring a plurality of call characteristics to the owner of the at least one incoming call establishment request.

30. The method of claim 25 wherein the step of informing the owner of the at least one incoming call establishment request that a connection has been established comprises the step of transferring a plurality of negotiated parameters to the owner of the at least one incoming call establishment request.

31. A program product comprising:
at least one signaling provider for determining ownership of at least one incoming call establishment request, said ownership being determined for a client amongst a plurality of clients and based on information supplied by said plurality of clients;
said signaling provider also using said information to negotiate connection parameters with a computer system that sent the at least one incoming call establishment request; and
signal bearing media bearing the at least one signaling provider.

32. The program product of claim 31 wherein the signal bearing media comprises transmission media.

33. The program product of claim 31 wherein the signal bearing media comprises recordable media.

* * * * *